United States Patent
Oshita et al.

(10) Patent No.: US 8,929,410 B2
(45) Date of Patent: Jan. 6, 2015

(54) ULTRAVIOLET LASER DEVICE

(75) Inventors: Yoshinori Oshita, Yoshikawa (JP); Akira Tokuhisa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/003,895

(22) PCT Filed: Mar. 23, 2012

(86) PCT No.: PCT/JP2012/057523
§ 371 (c)(1),
(2), (4) Date: Sep. 9, 2013

(87) PCT Pub. No.: WO2012/128354
PCT Pub. Date: Sep. 27, 2012

(65) Prior Publication Data
US 2013/0343410 A1     Dec. 26, 2013

(30) Foreign Application Priority Data
Mar. 24, 2011   (JP) .................. 2011-066775

(51) Int. Cl.
*H01S 3/10* (2006.01)
*G02F 1/37* (2006.01)

(52) U.S. Cl.
CPC .... *H01S 3/10* (2013.01); *G02F 1/37* (2013.01)
USPC .................................. 372/22; 372/5; 372/21

(58) Field of Classification Search
CPC . H01S 3/0092; H01S 3/1618; H01S 3/09415;
H01S 3/2316; H01S 5/0092; H01S 3/06754;
H01S 3/10; H01S 3/109; H01S 3/1616;
H01S 3/2383; H01S 3/2391; H01S 5/0604;
H01S 3/10007; H01S 3/10038; H01S 3/13;
H01S 3/1305; H01S 3/136; H01S 5/02284;
H01S 5/02415
USPC ..................... 372/5, 22, 21, 29.014
See application file for complete search history.

(56) References Cited

U.S. PATENT DOCUMENTS

| | | | | |
|---|---|---|---|---|
| 8,305,681 | B2* | 11/2012 | Sakuma et al. | 359/326 |
| 8,503,068 | B2* | 8/2013 | Sakuma | 359/328 |
| 8,780,946 | B2* | 7/2014 | Tokuhisa | 372/6 |
| 2005/0185683 | A1* | 8/2005 | Ohtsuki | 372/26 |
| 2006/0039423 | A1* | 2/2006 | Tokuhisa et al. | 372/22 |
| 2011/0122895 | A1* | 5/2011 | Savage-Leuchs et al. | 372/10 |
| 2013/0170509 | A1* | 7/2013 | Tokuhisa | 372/5 |

FOREIGN PATENT DOCUMENTS

| | | |
|---|---|---|
| JP | A-2004-86193 | 3/2004 |
| JP | A-2010-93210 | 4/2010 |

OTHER PUBLICATIONS

Lew Goldberg and W. K. Burns, "Deep UV to mid-IR generation with laser diodes and nonlinear frequency conversion", SSL7.1; pp. 459-460.*

Apr. 24, 2012 International Search Report issued in International Patent Application No. PCT/JP2012/057523.

* cited by examiner

*Primary Examiner* — Colleen A Matthews
*Assistant Examiner* — Delma R Forde
(74) *Attorney, Agent, or Firm* — Oliff PLC

(57) ABSTRACT

An ultraviolet laser device comprises a laser beam output unit that outputs infra-red laser beams, and a wavelength conversion unit that wavelength converts the infra-red laser beams. The laser beam output unit comprises a first laser beam output unit that outputs a first infra-red laser beam whose wavelength is 1900-2000 nm, and a second laser beam output unit that outputs a second infra-red laser beam whose wavelength is 1000-1100 nm. The wavelength conversion unit comprises a first element series that the first infra-red light beam is incident upon and propagated through, and a second element series that the laser light propagated through the first element series and the second infra-red laser beam are incident upon, combined in, and propagated through, and constructed so that ultraviolet laser light is outputted, due to the first and second infra-red laser beams being wavelength converted by optical wavelength conversion elements.

8 Claims, 4 Drawing Sheets

ULTRAVIOLET LASER DEVICE

TECHNICAL FIELD

The present invention relates to an ultraviolet laser device including a laser beam output unit that outputs laser light on an infra-red wavelength, and a wavelength conversion unit that incorporates an optical wavelength conversion element, and that converts the laser light on an infra-red wavelength outputted from the laser beam output unit into laser light on an ultraviolet wavelength.

BACKGROUND ART

As an ultraviolet laser device of the type described above that includes a laser beam output unit and a wavelength conversion unit, for example, a laser device that is used in an exposure device, an inspection device, a therapy device or the like is per se known. Generally, this type of laser device is built so as to amplify laser light on an infra-red wavelength emitted from a laser light source such as a DFB semiconductor laser or the like with an optical fiber amplifier, and so as to convert the wavelength of the amplified infrared light with an optical wavelength conversion element that is fitted to a wavelength conversion unit, thus outputting laser light on an ultraviolet wavelength. Due to the historical circumstances of optical fiber development, an erbium (Er) doped optical fiber amplifier (usually abbreviated as an "EDFA") that amplifies infra-red laser light on the 1.55 μm wavelength band is widely used for the optical fiber amplifier.

On the other hand, in devices of various types that use ultraviolet laser devices as light sources, while forming and observing minute structure become easier the shorter is the wavelength of the ultraviolet light to be outputted, the optical materials that are transparent in the ultraviolet region of 235 nm and below is limited. The oscillation wavelength of an ArF excimer laser is 193 nm, and this is already implemented in practice as an ultraviolet laser device. Accordingly, a wavelength conversion unit of an ultraviolet laser device has been built so as to wavelength convert an infra-red laser beam outputted from a laser light unit into ultraviolet laser light on the wavelength band of 190-200 nm, this being outputted (refer to Patent Documents #1 and #2). With this type of structure, an ultraviolet laser device that is compact and entirely solid-state, and that is easy to handle and operate, is implemented that outputs ultraviolet light on the wavelength band described above.

CITATION LIST

Patent Literature

Patent Document #1: Japanese Laid-Open Patent Publication 2004-86193;
Patent Document #2: Japanese Laid-Open Patent Publication 2010-93210.

SUMMARY OF THE INVENTION

Technical Problem

With an ultraviolet laser device of the type described above, while the structure of the wavelength conversion unit can be of various forms as disclosed in Japanese Laid-Open Patent Publication 2004-86193, generally, a plurality of propagation paths are formed, an optical wavelength conversion element is provided upon each of the propagation paths, and it is arranged for laser light to be outputted by superimposing the fundamental wave and higher order harmonics that are generated upon each propagation path a plurality of times. Due to this, the problems arise that the structure of the wavelength conversion unit becomes complicated, and that it is difficult to obtain a high wavelength conversion efficiency when the wavelength conversion unit is considered as a whole.

Furthermore, while a structure has also been proposed in which EDFAs are connected in a multi-stage element series in order to increase the infra-red laser beam output, the maximum average infra-red laser beam output obtained with an EDFA is no higher than around several tens of watts, so that there has been the problem that yet further increase of the output of ultraviolet laser light is difficult.

Solution To Problem

According to the first aspect of the present invention, an ultraviolet laser device comprises a laser beam output unit that outputs infra-red laser beams, and a wavelength conversion unit comprising optical wavelength conversion elements that wavelength convert the infra-red laser beams outputted from the laser beam output unit into a laser light beam of ultraviolet wavelength that is outputted; wherein: the laser beam output unit comprises a first laser beam output unit that outputs a first infra-red laser beam whose wavelength is 1900 to 2000 nm, and a second laser beam output unit that outputs a second infra-red laser beam whose wavelength is 1000 to 1100 nm; the wavelength conversion unit comprises a first element series that the first infra-red light beam from the first laser beam output unit is incident upon and propagated through, and a second element series that the laser light propagated through the first element series and the second infra-red laser beam outputted from the second laser beam output unit are incident upon, combined in, and propagated through; and constructed so that ultraviolet laser light is outputted from the second element series, due to the first and second infra-red laser beams that are incident upon the wavelength conversion unit being wavelength converted by optical wavelength conversion elements provided to the wavelength conversion unit.

According to the second aspect of the present invention, in the ultraviolet laser device of the first aspect, it is preferred that, wherein the optical wavelength conversion elements included in the wavelength conversion unit include: a first optical wavelength conversion element that generates the second harmonic of the first infra-red laser beam; a second optical wavelength conversion element that generates the second harmonic of the second harmonic that is emitted from the first optical wavelength conversion element, namely the fourth harmonic of the first infra-red laser beam; a third optical wavelength conversion element that generates preliminary stage ultraviolet laser light that is the second harmonic of the fourth harmonic emitted from the second optical wavelength conversion element, namely the eighth harmonic of the first infra-red laser beam; and a fourth optical wavelength conversion element that generates ultraviolet laser light by sum frequency generation of the preliminary stage ultraviolet laser light and the second infra-red laser beam.

According to the third aspect of the present invention, in the ultraviolet laser device of the second aspect, it is preferred that, wherein the first optical wavelength conversion element and the second optical wavelength conversion element are provided in the first element series, and the third optical wavelength conversion element and the fourth optical wavelength conversion element are provided in the second element series.

According to the fourth aspect of the present invention, in the ultraviolet laser device of the second aspect, it is preferred that, wherein the first optical wavelength conversion element, the second optical wavelength conversion element and the third optical wavelength conversion element are provided in the first element series, and the fourth optical wavelength conversion element is provided in the second element series.

According to the fifth aspect of the present invention, in the ultraviolet laser device of any one of the second to fourth aspect, it is preferred that, wherein the phase matching in the third optical wavelength conversion element and the phase matching in the fourth optical wavelength conversion element are non-critical phase matching.

According to the sixth aspect of the present invention, in the ultraviolet laser device of any one of the second to fifth aspect, it is preferred that, wherein the phase matching in the first optical wavelength conversion element and the phase matching in the second optical wavelength conversion element are quasi phase matching.

According to the seventh aspect of the present invention, in the ultraviolet laser device of any one of the first to sixth aspect, it is preferred that, wherein the first laser beam output unit comprises a thulium doped optical fiber amplifier.

According to the eighth aspect of the present invention, in the ultraviolet laser device of any one of the first to seventh aspect, it is preferred that, wherein the second laser beam output unit comprises an ytterbium doped optical fiber amplifier.

According to the ninth aspect of the present invention, in the ultraviolet laser device of any one of the second to eighth aspect, it is preferred that, wherein the ultraviolet laser light is deep ultraviolet light whose wavelength is 190 to 200 nm.

It should be understood that, in this specification, the wavelength of the ultraviolet laser beam generated from the third wavelength conversion element is described "preliminary stage ultraviolet laser light" for distinguishing from "lase light" generated from the fourth wavelength conversion element and outputted from the wavelength conversion unit, for descriptive purposes.

Advantageous Effect of the Invention

According to one aspect of the present invention, it is possible to provide a novel means that can output ultraviolet laser light with a simplified structure in which superposition is performed only once. Furthermore, according to the manner in which the wavelength conversion unit is made up from the first through the fourth optical wavelength conversion elements, it is possible to provide a novel means that can output ultraviolet laser light with a simplified structure that incorporates only four optical wavelength conversion elements. Yet further, according to the manner in which the first and the second optical wavelength conversion elements are arranged in the first element series, while the third and the fourth optical wavelength conversion elements are arranged in the second element series, it is possible to dispose the optical elements such as the mirror that superimposes the light beams and the condensing lenses and so on in the infrared to visible region, so that it is possible to provide an ultraviolet laser device that is simple in structure and moreover cheap in cost, and that is moreover capable of operating in a stable manner over the long term.

Furthermore, according to the manner in which the phase matching in the third and fourth optical wavelength conversion elements is made to be non-critical phase matching, while the phase matching in the first and second optical wavelength conversion elements is made to be quasi phase matching, it is possible to provide an ultraviolet laser device that has high light beam quality and high wavelength conversion efficiency. Moreover, according to the manner in which the first laser beam output unit is built using a thulium doped optical fiber amplifier, while the second laser beam output unit is built using an ytterbium doped optical fiber amplifier, it is possible to supply a novel means that can yet further increase the output of ultraviolet laser light.

DESCRIPTION OF EMBODIMENTS

Figure 1:
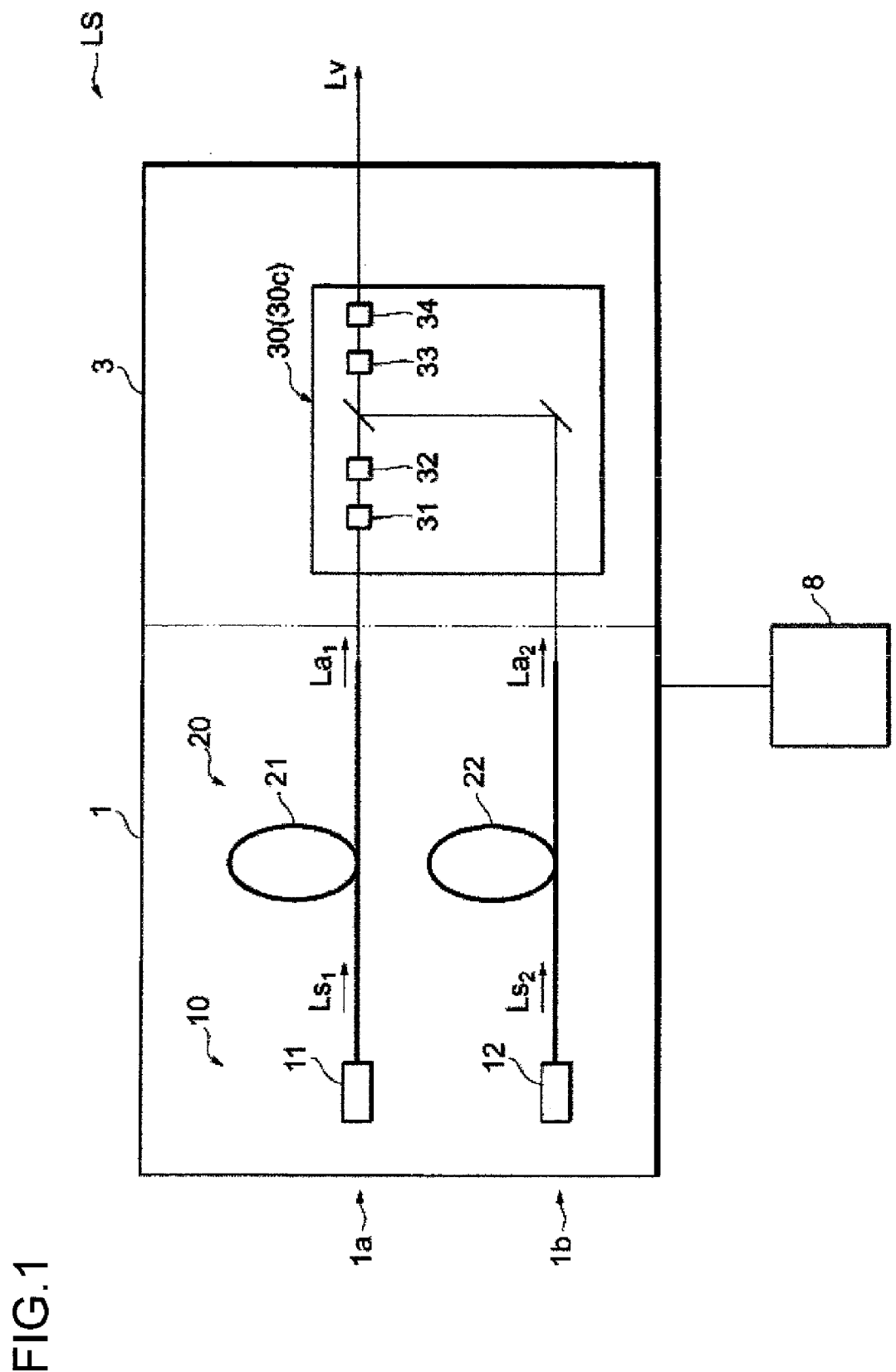
FIG. 1 is a figure showing the overall structure of an ultraviolet laser device according to the present invention, by way of example.

In the following, embodiments for implementation of the present invention will be explained with reference to the drawings. The overall structure of an ultraviolet laser device LS (LS1 through LS3) that is an example of implementation of the present invention is shown in FIG. 1. This ultraviolet laser device LS comprises a laser beam output unit 1 that outputs infra-red laser beams La (La1, La2), a wavelength conversion unit 3 that includes optical wavelength conversion elements and that wavelength converts the infra-red laser beams La outputted from the laser beam output unit 1 into an ultraviolet laser beam Lv that is then outputted, a control unit 8 that controls the laser beam output unit 1 and the wavelength conversion unit 3, and so on.

The laser beam output unit 1 comprises a first laser beam output unit 1a that outputs an infra-red laser beam La1 (i.e. a first infra-red laser beam) with a first fundamental wave of 1900 to 2000 nm wavelength, and a second laser beam output unit 1b that outputs an infra-red laser beam La2 (i.e. a second infra-red laser beam) with a second fundamental wave of 1000 to 1100 nm wavelength. In concrete terms, the wavelengths of the first infra-red laser beam La1 and of the second infra-red laser beam La2 may be set appropriately, according to the wavelength of the ultraviolet laser beam Lv to be outputted from the ultraviolet laser device LS, and according to the structure of the wavelength conversion unit 3.

In the structural example shown in FIG. 1, the laser beam output unit 1 comprises a laser light generation unit 10 that outputs seed light, and an amplification unit 20 that amplifies the seed light outputted from the laser light generation unit 10.

The laser light generation unit 10 comprises a first laser light source 11 that generates seed light Ls1 of the first fundamental wave, and a second laser light source 12 that generates seed light Ls2 of the second fundamental wave. And the amplification unit 20 comprises a first optical fiber amplifier 21 that is provided to correspond to the first laser light source, and a second optical fiber amplifier 22 that is provided to correspond to the second laser light source.

According to this structure, in the first laser beam output unit 1a, the seed light Ls1 of the first fundamental wave that is generated by the first laser light source 11 is amplified to a predetermined output by the first optical fiber amplifier 21, and this is outputted as the amplified first infra-red laser beam La1. Moreover, in the second laser beam output unit 1b, the seed light Ls2 of the second fundamental wave that is generated by the second laser light source 12 is amplified to a predetermined output by the second optical fiber amplifier 22, and this is outputted as the amplified second infra-red laser beam La2. It should be understood that, in FIG. 1, the sources of excitation light for the first optical fiber amplifier 21 and second optical fiber amplifier 22 are omitted.

A DFB (Distributed Feedback) semiconductor laser whose oscillation wavelength is on the 2 μm band may be appropriately used for the first laser light source 11, and a DFB semiconductor laser whose oscillation wavelength is on the 1.1 μm band may be appropriately used for the second laser light source 12. A DFB semiconductor laser is capable of generating seed light of a single wavelength that is restricted to a narrow band by oscillating in a temperature controlled state due to the provision of a temperature regulation device that employs a Peltier element or the like. By waveform control of the excitation current, it is possible to cause a DFB semiconductor laser to perform CW oscillation or pulse oscillation at any desired intensity. It should be understood that it would also be acceptable to provide an external modulator such as an EOM (Electro Optical Modulator) or the like to the laser light generation unit 10, and to arrange to output pulsed light of the required waveform by chopping the output light of a laser light source that is being caused to perform CW (Continuous Wave) oscillation or pulse oscillation, with this external modulator.

For the first optical fiber amplifier 21, a thulium doped optical fiber amplifier (TDFA) in which thulium (Tm) is doped into the core of an optical fiber for amplification may appropriately be employed. A thulium doped optical fiber amplifier has a gain in the wavelength band of 1900 to 2000 nm, and it amplifies the seed light Ls1 of a predetermined wavelength within the above described wavelength band emitted from the first laser light source 11, and outputs the amplified first infra-red laser beam La1 that has thus been amplified to the wavelength conversion unit 3.

For the second optical fiber amplifier 22, an ytterbium doped optical fiber amplifier (YDFA) in which ytterbium (Yb) is doped into the core of an optical fiber for amplification may appropriately be employed. An ytterbium doped optical fiber amplifier has a gain in the wavelength band of 1000 to 1100 nm, and it amplifies the seed light Ls2 of a predetermined wavelength within the above described wavelength band emitted from the second laser light source 12, and outputs the amplified second infra-red laser beam La1 that has thus been amplified to the wavelength conversion unit 3.

While in the above an example has been shown in which the laser beam output units 1a and 1b are constituted by the laser light sources 11 and 12 and by the optical fiber amplifiers 21 and 22, it would also be acceptable to construct them with optical fiber lasers in which resonators are assembled at the input and output emission ends.

Figure 2:
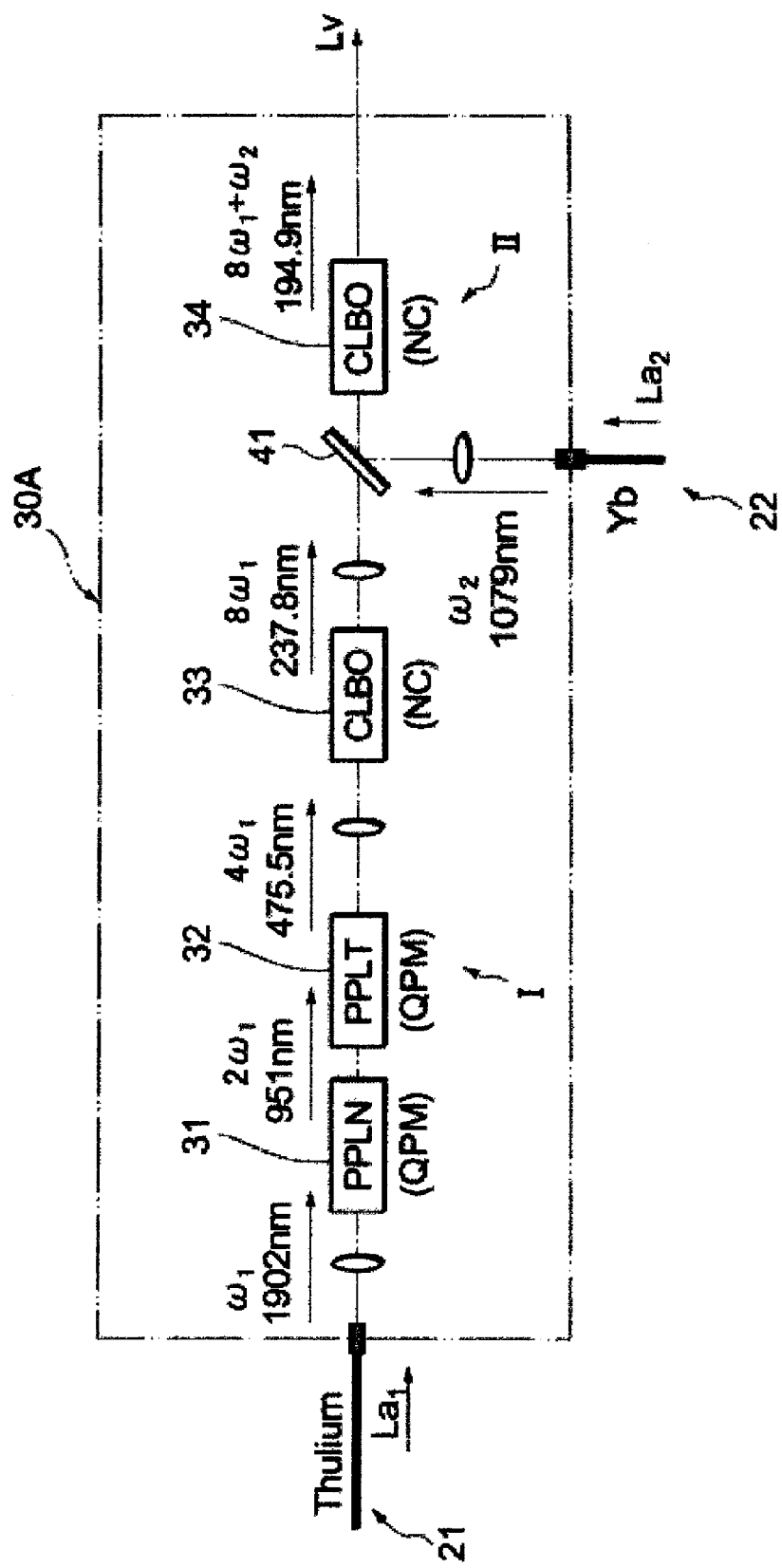
FIG. 2 is a schematic structural diagram showing a first structural example of this ultraviolet laser device.
Figure 3:
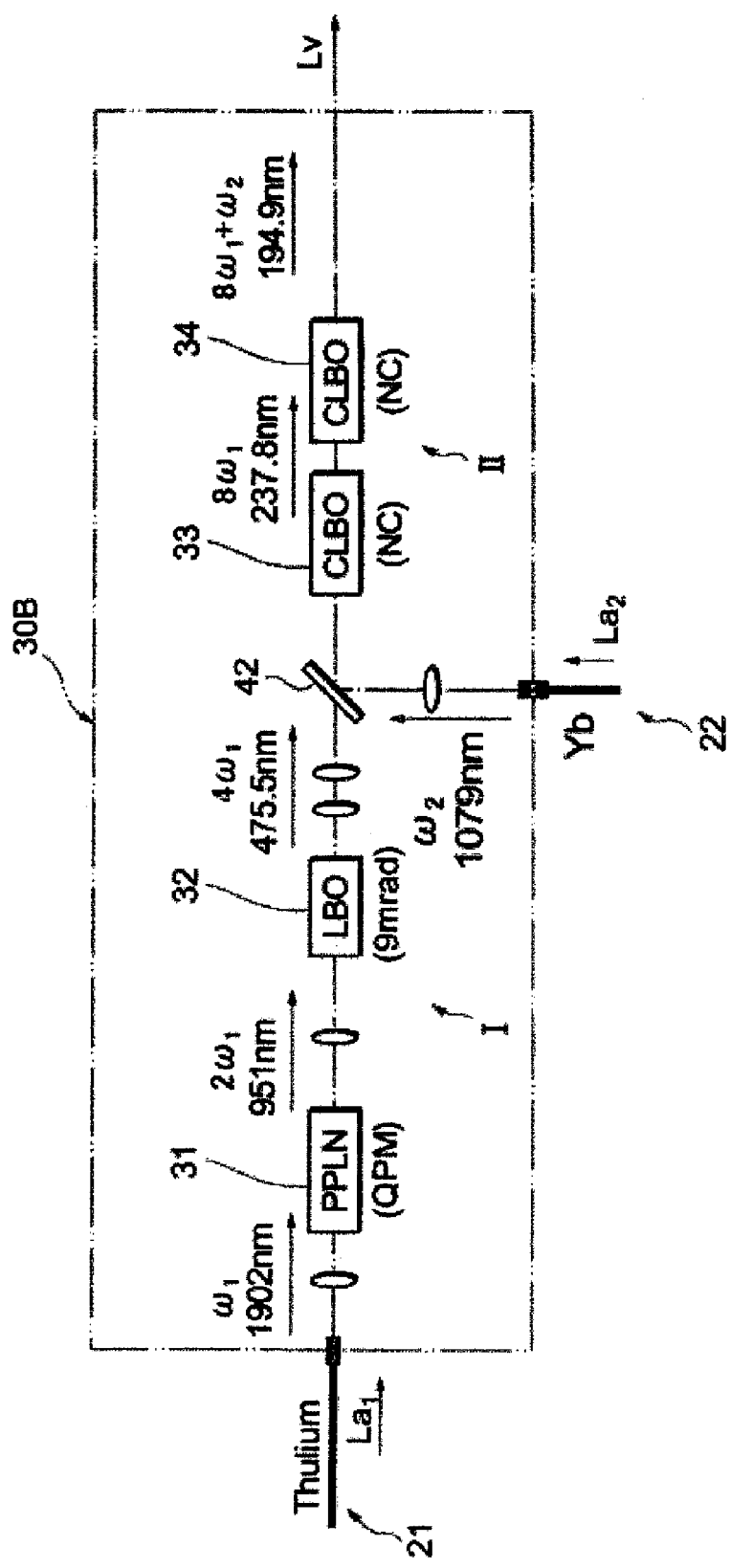
FIG. 3 is a schematic structural diagram showing a second structural example of this ultraviolet laser device.
Figure 4:
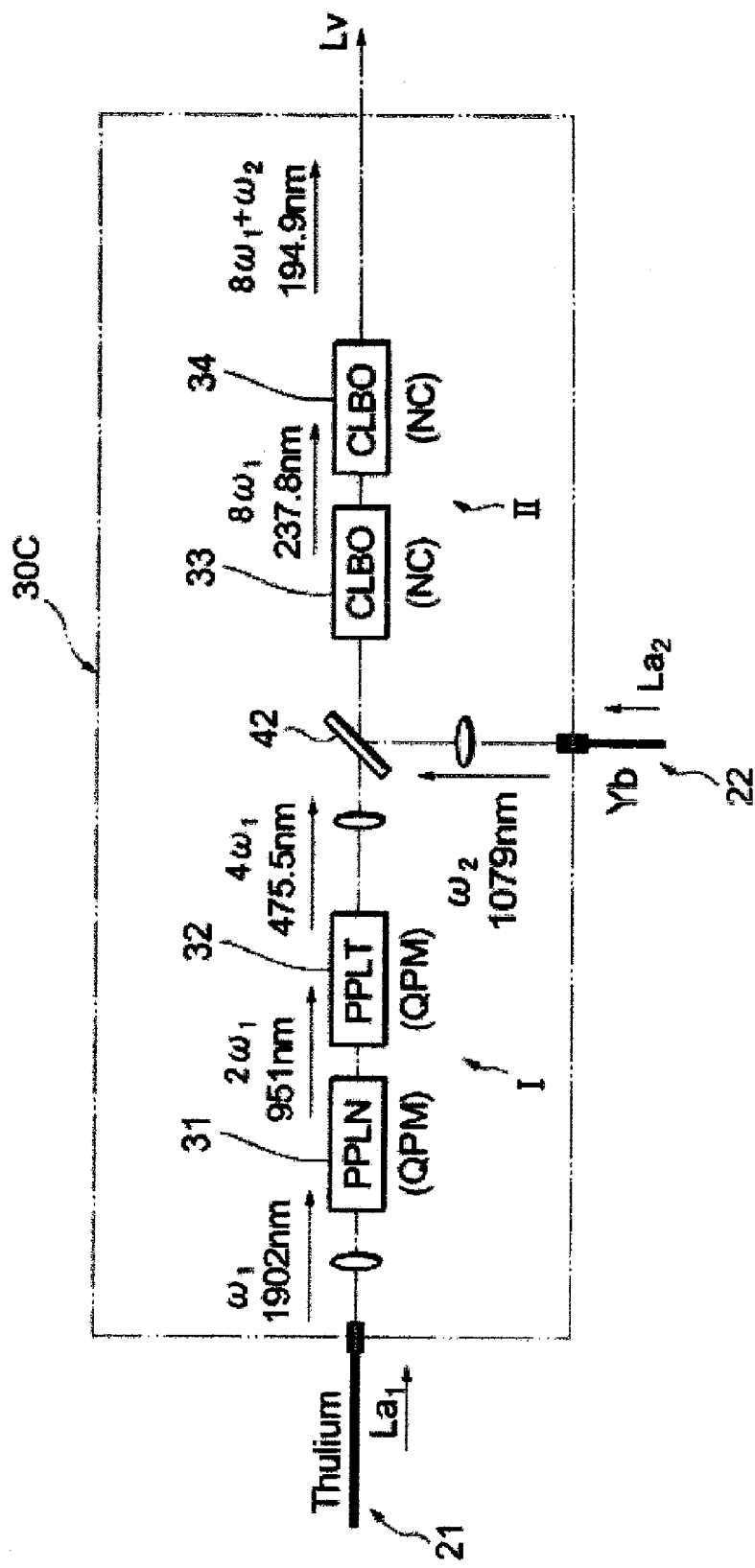
FIG. 4 is a schematic structural diagram showing a third structural example of this ultraviolet laser device.

A wavelength conversion optical system 30 (30A through 30C) that comprises a plurality of optical wavelength conversion elements and mirrors and so on is provided to the wavelength conversion unit 3. In FIGS. 2 through 4, there are shown the overall structures of wavelength conversion optical systems 30A through 30C in ultraviolet laser devices LS1 through LS3 of Structural Examples #1 through #3 that respectively employ these wavelength conversion optical systems 30A through 30C. It should be understood that, in these figures, the objects upon the optical paths shown as elliptical shapes are collimator lenses and condensing lenses, but explanation of these is omitted.

Each of the wavelength conversion optical systems 30A through 30C comprises a first element series I upon which the first infra-red laser beam La1 outputted from the first laser beam output unit 1a is incident and through which it propagates, and a second element series II upon which the laser light propagated through the first element series and also the second infra-red laser beam La2 outputted from the second laser beam output unit 1b are incident, and in which they are combined and propagated. It is arranged for the first infra-red laser beam La1 and the second infra-red laser beam La2 that are incident upon the wavelength conversion unit 3 to be sequentially wavelength converted by the optical wavelength conversion elements that are provided to the wavelength conversion unit 3, and for the ultraviolet laser beam Lv to be outputted from the second element series II. With an ultraviolet laser device having this type of overall structure, it is possible to output ultraviolet laser light with a simplified structure in which superposition is performed only once.

Each of the wavelength conversion optical systems 30A through 30C basically comprises optical wavelength conversion elements 31 through 34. The first optical wavelength conversion element 31 is an optical wavelength conversion element that generates the second harmonic of the first infra-red laser beam La1 (i.e. of the first fundamental wave) by second harmonic generation (SHG: Second Harmonic Generation). The second optical wavelength conversion element 32 is an optical wavelength conversion element that generates, by second harmonic generation, the second harmonic of the above described second harmonic emitted from the first optical wavelength conversion element 31, in other words that generates the fourth harmonic of the first fundamental wave. The third optical wavelength conversion element 33 is an optical wavelength conversion element that generates, by second harmonic generation, the second harmonic of the above described fourth harmonic emitted from the second optical wavelength conversion element 32, in other words that generates a preliminary stage ultraviolet light beam that is the eighth harmonic of the first fundamental wave. And the fourth optical wavelength conversion element 34 is a wavelength conversion element that generates the ultraviolet laser beam Lv by sum frequency generation (SFG: Sum Frequency Generation) of the preliminary stage ultraviolet laser light beam emitted from the third optical wavelength conversion element 33 and the second infra-red laser beam La2 (i.e. the second fundamental wave). According to this type of structure, it is possible to output ultraviolet laser light with a simple structure that incorporates only four optical wavelength conversion elements.

Furthermore, with the ultraviolet laser device LS having the overall structure described above, an ytterbium doped optical fiber amplifier and a thulium doped optical fiber amplifier are used for the first optical fiber amplifier 21 and the second optical fiber amplifier 22 respectively, and, with both of these, it is possible to obtain high output infra-red laser beams having power of a hundred watts or greater in a simple and easy manner. Due to this, it is possible to implement great increase of the output of an all solid state type ultraviolet laser device, although it had previously been considered that increase of the output power of such devices had almost arrived at its limit.

In the following, structural examples of ultraviolet laser devices LS that have this type of characteristic and that output ultraviolet laser beams Lv of wavelength 200 nm or shorter (i.e. deep ultraviolet laser light beams) will be explained in concrete terms. At this time, the concrete structure of an ultraviolet laser device LS having the abovementioned type of characteristic can be constructed in an extremely large number of combinations by setting the wavelength λ1 of the first infra-red laser beam La1 (i.e. of the first fundamental wave) outputted from the first laser beam output unit 1a, the wavelength λ2 of the second infra-red laser beam La2 (i.e. of the second fundamental wave) outputted from the second laser beam output unit 1b, and the wavelength λv of the ultraviolet laser beam Lv outputted from the wavelength conversion unit 3 as desired.

Thus in this specification, as representative examples, structural examples of three different types will be explained, in which the wavelength of the first fundamental wave outputted from the first laser beam output unit 1a is λ1=1902 nm, the wavelength of the second fundamental wave outputted from the second laser beam output unit 1b is λ2=1079 nm, and the wavelength of the ultraviolet laser beam Lv outputted from the wavelength conversion unit 3 is λv=194.9 nm.

In each of these structural examples of three different types, the first laser beam output unit 1a generates seed light Ls1 of wavelength λ1=1902 nm with the first laser light source 11 and amplifies this with the first optical fiber amplifier 21 (that is a thulium doped optical fiber amplifier), and the amplified first infra-red laser beam La1 resulting after amplification to a predetermined output is incident upon the wavelength conversion optical system 30 (30A through 30C). In a similar manner, the second laser beam output unit 1b generates seed light Ls2 of wavelength λ1=1079 nm with the second laser light source 12 and amplifies this with the second optical fiber amplifier 22 (that is an ytterbium doped optical fiber amplifier), and the amplified second infra-red laser beam La2 resulting after amplification to a predetermined output is incident upon the wavelength conversion optical system 30 (30A through 30C).

Structural Example #1

In the wavelength conversion optical system 30A of Structural Example #1, three optical wavelength conversion elements 31 through 33 are provided in a first element series I upon which a first infra-red laser beam La1 (i.e. a first fundamental wave) is incident, and one optical wavelength conversion element 34 is provided in a second element series II upon which a second infra-red laser beam La2 (i.e. a second fundamental wave) is incident and in which it is combined with the first laser beam.

Due to the process of being propagated through the first element series I, the first fundamental wave that is incident upon the first element series I and that has wavelength λ1=1902 nm and angular frequency ω1 is wavelength converted by the three optical wavelength conversion elements 31 through 33 that are provided to the first element series into its eight harmonic, whose angular frequency is eight times that of the first fundamental wave (i.e. 8ω1) and whose wavelength is one eighth of the wavelength thereof (i.e. λ⅛=237.8 nm).

The first optical wavelength conversion element 31 wavelength converts the first fundamental wave (i.e. the first infra-red laser beam) whose angular frequency is ω1 into its second harmonic whose angular frequency is 2ω1. In this structural example, a PPLN crystal (Periodically Poled LN: $LiNbO_3$ formed in a periodically inverted polarized structure) is used as the first optical wavelength conversion element 31, and a phase matching condition according to quasi phase matching (QPM: Quasi Phase Matching) is established. Generation of the second harmonic of the first fundamental wave is performed by the first optical wavelength conversion element 31, so that the second harmonic is generated whose angular frequency is twice that of the first fundamental wave (i.e. 2ω1) and whose wavelength is one half of the wavelength thereof (i.e. λ½=951 nm). This second harmonic of wavelength 951 nm that has been generated by the first optical wavelength conversion element 31 is incident upon the second optical wavelength conversion element 32.

The second optical wavelength conversion element 32 wavelength converts the second harmonic of angular frequency 2ω1 that has been generated by the first optical wavelength conversion element 31 into the fourth harmonic whose angular frequency is 4ω1. In this structural example, a PPLT crystal (Periodically Poled LT: $LiTaO_3$ formed in a periodically inverted polarized structure) is used as the second optical wavelength conversion element 32, and a phase matching condition according to quasi phase matching is established. Second harmonic generation is then performed by the second optical wavelength conversion element 32, so that the fourth harmonic is generated whose angular frequency is four times that of the first fundamental wave (i.e. 4ω1) and whose wavelength is one quarter of the wavelength thereof (i.e. λ¼=475.5 nm). This fourth harmonic of wavelength 475.5 nm that has been generated by the second optical wavelength conversion element 32 is condensed, and then is incident upon the third optical wavelength conversion element 33.

The third optical wavelength conversion element 33 wavelength converts the fourth harmonic of angular frequency 4ω1 that has been generated by the second optical wavelength conversion element 32 into the eighth harmonic whose angular frequency is 8ω1. In this structural example, a CLBO crystal ($CsLiB_6O_{10}$) is used as the third optical wavelength conversion element 33, and a phase matching condition according to non-critical phase matching (NCPM: Non-Critical Phase Matching) is established. Generation of the second harmonic of the fourth harmonic is performed by the third optical wavelength conversion element 33, so that the eighth harmonic is generated whose angular frequency is eight times that of the first fundamental wave (i.e. 8ω1) and whose wavelength is one eighth of the wavelength thereof (i.e. λ⅛=237.8 nm). The eighth harmonic of wavelength 237.8 nm generated by the third optical wavelength conversion element 33 is incident upon a dichroic mirror 41.

The dichroic mirror 41 is adapted to pass the eighth harmonic of the first fundamental wave of wavelength 237.8 nm, and to reflect the second infra-red laser beam of wavelength 1079 nm (i.e. the second fundamental wave). The eighth harmonic of the first fundamental wave (8ω1) passes through the dichroic mirror 41 and is condensed and incident upon the fourth optical wavelength conversion element 34 that is provided in the second element series II.

The second infra-red laser beam of wavelength λ2=1079 nm (i.e. the second fundamental wave) that is outputted from the second optical fiber amplifier 22 is incident upon the dichroic mirror 41 so as to intersect upon the optical axis with the eighth harmonic (8ω1) of the first fundamental wave that passes through the dichroic mirror 41. Thus, the second fundamental wave that has been reflected by the dichroic mirror 41 is coaxially superimposed upon the eighth harmonic of the first fundamental wave that has passed through the dichroic mirror 41, and the combination is then condensed and is incident upon the fourth optical wavelength conversion element 34 in the second element series II.

The pass wavelength of the dichroic mirror 41 is shorter than the wavelength of the second fundamental wave, and may be any appropriate wavelength within a wavelength band that includes the wavelength of the eighth harmonic of the first fundamental wave. For example, if it is arranged to set the pass wavelength to less than around 350 nm (so that the reflection wavelength is 350 nm and greater), thus causing the first fundamental wave ($\omega 1$), its second harmonic ($2\omega 1$), and its fourth harmonic ($4\omega 1$) to be reflected and to be absorbed in some appropriate light absorbent material, then it is possible to prevent laser light of non-required wavelengths (to prevent laser light of such a wavelength emitting from the wavelength conversion unit 3) from being incident upon the optical wavelength conversion element in the second element series II.

The fourth optical wavelength conversion element 34 that is provided in the second element series II generates ultraviolet laser light of wavelength 194.9 nm from the eighth harmonic of the first fundamental wave that has passed through the dichroic mirror 41 and the second fundamental wave that has been superimposed thereupon after having been reflected by the dichroic mirror 41. In this structural example, a CLBO crystal ($CsLiB_6O_{10}$) is used as the fourth optical wavelength conversion element 34, and a phase matching condition according to non-critical phase matching (NCPM: Non-Critical Phase Matching) is established. Sum frequency generation of the eighth harmonic of the first fundamental wave of wavelength 237.8 nm and the second fundamental wave of wavelength 1079 nm is performed by the fourth optical wavelength conversion element 34, and thereby ultraviolet laser light of wavelength 194.9 nm is generated.

The ultraviolet laser light of wavelength 194.9 nm generated by the fourth optical wavelength conversion element 34 is outputted from the final end of the second element series II, and this ultraviolet laser beam Lv of wavelength 194.9 nm is outputted from the wavelength conversion optical system 30A of this ultraviolet laser device LS1.

In this type of ultraviolet laser device LS1 that is equipped with the wavelength conversion optical system 30A, the phase matching in the first and second optical wavelength conversion elements 31 and 32 is quasi phase matching (QPM), while the phase matching in the third and fourth optical wavelength conversion elements 33 and 34 is non-critical phase matching (NCPM), and thus all of the four optical wavelength conversion elements are used with types of phase matching in which walk-off does not occur. Due to this, according to this ultraviolet laser device LS1, in addition to the fundamental beneficial effects explained above, it is also possible to attain the beneficial effects that wavelength conversion is performed at extremely high efficiency by the wavelength conversion optical system 30A, and that, along with obtaining high output efficiency, it is also possible to obtain an ultraviolet laser beam of high quality.

Structural Example #2

Next, an ultraviolet laser device LS2 that incorporates the wavelength conversion optical system 30B of Structural Example #2 will be explained with reference to FIG. 3. In the wavelength conversion optical system 30B of Structural Example #2, two optical wavelength conversion elements 31 and 32 are provided in a first element series I upon which a first infra-red laser beam La1 (i.e. a first fundamental wave) is incident, and two optical wavelength conversion elements 33 and 34 are provided in a second element series II upon which a second infra-red laser beam La2 (i.e. a second fundamental wave) is incident in combination with the first infra-red laser beam.

In the process of being propagated through the first element series I, the first fundamental wave that is incident upon the first element series I and has wavelength $\lambda 1=1902$ nm and angular frequency $\omega 1$ is wavelength converted by the two optical wavelength conversion elements 31 and 32 that are provided to the first element series into its fourth harmonic, whose angular frequency is four times that of the first fundamental wave (i.e. $4\omega 1$) and whose wavelength is one quarter of the wavelength thereof (i.e. $\lambda \frac{1}{4}=475.5$ nm).

The first optical wavelength conversion element 31 wavelength converts the first fundamental wave whose angular frequency is $\omega 1$ into its second harmonic whose angular frequency is $2\omega 1$. In a similar manner to the case of the structural example described above, a PPLN crystal is used as the first optical wavelength conversion element 31, and a phase matching condition according to quasi phase matching (QPM) is established. Generation of the second harmonic of the first fundamental wave is performed by the first optical wavelength conversion element 31, so that the second harmonic is generated whose angular frequency is twice that of the first fundamental wave (i.e. $2\omega 1$) and whose wavelength is one half of the wavelength thereof (i.e. $\lambda \frac{1}{2}=951$ nm). This second harmonic of wavelength 951 nm that has been generated by the first optical wavelength conversion element 31 is incident upon the second optical wavelength conversion element 32.

The second optical wavelength conversion element 32 wavelength converts the second harmonic of angular frequency $2\omega 1$ that has been generated by the first optical wavelength conversion element 31 into the fourth harmonic whose angular frequency is $4\omega 1$. In this structural example, an LBO crystal ($LiB_3O_5$) is used as the second optical wavelength conversion element 32, and a phase matching condition according to Type I phase matching is established. Second harmonic generation is performed by the second optical wavelength conversion element 32, so that the fourth harmonic is generated whose angular frequency is four times that of the first fundamental wave (i.e. $4\omega 1$) and whose wavelength is one quarter of the wavelength thereof (i.e. $\lambda \frac{1}{4}=475.5$ nm).

At this time, the fourth harmonic laser light beam that has been emitted from the second optical wavelength conversion element 32 becomes slightly elliptical due to walk-off, but the walk-off angle is small at around 9 mrad, and the light beam is corrected into a circular light beam by two cylindrical lenses, and is then incident upon the dichroic mirror 42.

The dichroic mirror 42 is adapted to pass the fourth harmonic of the first fundamental wave of wavelength 475.5 nm, and to reflect the second infra-red laser beam of wavelength 1079 nm (i.e. the second fundamental wave). The fourth harmonic of the first fundamental wave ($4\omega 1$) passes through the dichroic mirror 42 and is condensed and incident upon the third optical wavelength conversion element 33 that is provided in the second element series II.

The second infra-red laser beam of wavelength $\lambda 2=1079$ nm (i.e. the second fundamental wave) that is outputted from the second optical fiber amplifier 22 is incident upon the dichroic mirror 42 so as to intersect upon the optical axis with the fourth harmonic ($4\omega 1$) of the first fundamental wave that passes through the dichroic mirror 42. Thus, the second fundamental wave that has been reflected by the dichroic mirror 42 is coaxially superimposed upon the fourth harmonic of the first fundamental wave that has passed through the dichroic mirror 42, and the combination is then condensed and is incident upon the third optical wavelength conversion element 33 in the second element series II.

The pass wavelength of the dichroic mirror 42 is shorter than the wavelength of the second fundamental wave, and may be any appropriate wavelength within a wavelength band that includes the wavelength of the fourth harmonic of the first fundamental wave. For example, if it is arranged to set the pass wavelength to less than around 500 nm (so that the reflection wavelength is 500 nm and greater), thus causing the first fundamental wave (ω1) and its second harmonic (2ω1) to be reflected and to be absorbed in some appropriate light absorbent material, then it is possible to prevent laser light of non-required wavelengths (to prevent laser light of such a wavelength emitting from the wavelength conversion unit 3) from being incident upon the optical wavelength conversion elements in the second element series II.

The third optical wavelength conversion element 33 that is provided in the second element series II wavelength converts the fourth harmonic of angular frequency 4ω1 that has passed through the dichroic mirror 42 into the eighth harmonic whose angular frequency is 8ω1. A CLBO crystal is used as the third optical wavelength conversion element 33, and a phase matching condition according to non-critical phase matching (NCPM) is established. Generation of the second harmonic of the fourth harmonic is performed by the third optical wavelength conversion element 33, so that the eighth harmonic is generated whose angular frequency is eight times that of the first fundamental wave (i.e. 8ω1) and whose wavelength is one eighth of the wavelength thereof (i.e. λ⅛=237.8 nm).

The eighth harmonic of wavelength 237.8 nm generated by the third optical wavelength conversion element 33 (i.e. ultraviolet laser light at a preliminary stage) is incident upon the fourth optical wavelength conversion element 34 that is disposed in contact with the third optical wavelength conversion element 33. And the second fundamental wave that has been reflected by the dichroic mirror 42 passes through the third optical wavelength conversion element 33 and is incident upon the fourth optical wavelength conversion element 34.

The fourth optical wavelength conversion element 34 generates ultraviolet laser light of wavelength 194.9 nm from the eighth harmonic of the first fundamental wave generated by the third optical wavelength conversion element 33 and the second fundamental wave that has passed through the third optical wavelength conversion element 33. A CLBO crystal is used as the fourth optical wavelength conversion element 34, and a phase matching condition according to non-critical phase matching (NCPM) is established. Sum frequency generation of the eighth harmonic of the first fundamental wave of wavelength 237.8 nm and the second fundamental wave of wavelength 1079 nm is performed by the fourth optical wavelength conversion element 34, and thereby ultraviolet laser light of wavelength 194.9 nm is generated.

The ultraviolet laser light of wavelength 194.9 nm generated by the fourth optical wavelength conversion element 34 is outputted from the final end of the second element series II, and this ultraviolet laser beam Lv of wavelength 194.9 nm is outputted from the wavelength conversion optical system 30B of this ultraviolet laser device LS2.

In this type of ultraviolet laser device LS2 that is equipped with the wavelength conversion optical system 30B, the phase matching in the first optical wavelength conversion element 31 is quasi phase matching (QPM), while the phase matching in the third and fourth optical wavelength conversion elements 33 and 34 is non-critical phase matching (NCPM), and thus three of the four optical wavelength conversion elements are used with types of phase matching in which walk-off does not occur. Moreover, even in the case of the second optical wavelength conversion element 32 with which walk-off does take place, the angle thereof is extremely small. Due to this, according to this ultraviolet laser device LS2, in addition to the fundamental beneficial effects explained above, it is also possible to attain the beneficial effects that wavelength conversion is performed at high efficiency by the wavelength conversion optical system 30B, and that, along with obtaining comparatively high output efficiency, it is also possible to obtain an ultraviolet laser beam of satisfactory quality.

Furthermore since, in the ultraviolet laser device LS2 of this structural example, the optical elements such as the mirror that causes the light beams to be superimposed and the condensing lenses and so on are disposed in the infra-red to visible region, accordingly it is possible to anticipate that these optical elements will have longer lives, since they are prevented from experiencing damage due to light in the ultraviolet region. While, if optical elements such as a mirror or condensing lenses and so on are disposed in the ultraviolet region, then it becomes necessary to provide a shifting construction for periodically shifting these optical elements, on the other hand, according to this structural example, it is possible to omit this type of shifting mechanism, and due to this the advantageous effects are obtained that it is possible to simplify the structure and make it cheaper, and that it is possible to operate in a stable manner over a long time period. Furthermore, since the third and fourth optical wavelength conversion elements 33 and 34 are arranged so as to be in mutual contact, accordingly it becomes possible to mount them both upon the same shifting stage, and due to this it becomes possible to shift both of the optical wavelength conversion elements 33 and 34 simultaneously. Because of this, it becomes possible to reduce the cost.

Structural Example #3

Next, an ultraviolet laser device LS3 that incorporates the wavelength conversion optical system 30C of Structural Example #3 will be explained with reference to FIG. 4. In the wavelength conversion optical system 30C of Structural Example #3, two optical wavelength conversion elements 31 and 32 are provided in a first element series I upon which a first infra-red laser beam La1 (i.e. a first fundamental wave) is incident, and two optical wavelength conversion elements 33 and 34 are provided in a second element series II upon which a second infra-red laser beam La1 (i.e. a second fundamental wave) is incident in combination with the first infra-red laser beam.

In this process of being propagated through the first element series I, the first fundamental wave that is incident upon the first element series I and has wavelength λ1=1902 nm and angular frequency ω1 is wavelength converted by the two optical wavelength conversion elements 31 and 32 that are provided to the first element series into its fourth harmonic, whose angular frequency is four times that of the first fundamental wave (i.e. 4ω1) and whose wavelength is one quarter of the wavelength thereof (i.e. λ¼=475.5 nm).

The first optical wavelength conversion element 31 wavelength converts the first fundamental wave whose angular frequency is ω1 into its second harmonic whose angular frequency is 2ω1. In a similar manner to the cases of the structural examples described above, a PPLN crystal is used as the first optical wavelength conversion element 31, and a phase matching condition is established by quasi phase matching (QPM). Generation of the second harmonic of the first fundamental wave is performed by the first optical wavelength conversion element 31, so that the second harmonic is generated whose angular frequency is twice that of the first fundamental wave (i.e. 2ω1) and whose wavelength is one half of the wavelength thereof (i.e. λ½=951 nm). This second harmonic of wavelength 951 nm that has been generated by the first optical wavelength conversion element 31 is incident upon the second optical wavelength conversion element 32.

The second optical wavelength conversion element 32 wavelength converts the second harmonic of angular frequency 2ω1 that has been generated by the first optical wavelength conversion element 31 into the fourth harmonic whose angular frequency is 4ω1. In this structural example, a PPLT crystal is used as the second optical wavelength conversion element 32, and a phase matching condition according to quasi phase matching (QPM) is established. Second harmonic generation is then performed by the second optical wavelength conversion element 32, so that the fourth harmonic is generated whose angular frequency is four times that of the first fundamental wave (i.e. 4ω1) and whose wavelength is one quarter of the wavelength thereof (i.e. λ¼=475.5 nm). This fourth harmonic of wavelength 475.5 nm that has been generated by the second optical wavelength conversion element 32 is incident upon a dichroic mirror 42.

The dichroic mirror 42 is adapted to pass the fourth harmonic of the first fundamental wave of wavelength 475.5 nm, and to reflect the second infra-red laser beam of wavelength 1079 nm (i.e. the second fundamental wave). The fourth harmonic of the first fundamental wave (4ω1) passes through the dichroic mirror 42 and is condensed and incident upon the third optical wavelength conversion element 33 that is provided in the second element series II.

The second infra-red laser beam of wavelength λ2=1079 nm (i.e. the second fundamental wave) that is outputted from the second optical fiber amplifier 22 is incident upon the dichroic mirror 42 so as to intersect upon the optical axis with the fourth harmonic (4ω1) of the first fundamental wave that passes through the dichroic mirror 42. Thus, the second fundamental wave that has been reflected by the dichroic mirror 42 is coaxially superimposed upon the fourth harmonic of the first fundamental wave that has passed through the dichroic mirror 42, and the combination is then condensed and is incident upon the third optical wavelength conversion element 33 in the second element series II.

The pass wavelength of the dichroic mirror 42 may be set in a similar mariner to the case of the dichroic mirror in Structural Example #2. For example, by setting the pass wavelength to less than around 500 nm (so that the reflection wavelength is 500 nm and greater), it is possible to prevent laser light of non-required wavelengths (to prevent laser light of such a wavelength emitting from the wavelength conversion unit 3) from being incident upon the optical wavelength conversion elements in the second element series II.

The third optical wavelength conversion element 33 that is provided in the second element series II wavelength converts the fourth harmonic of angular frequency 4ω1 that has passed through the dichroic mirror 42 into the eighth harmonic whose angular frequency is 8ω1. A CLBO crystal is used as the third optical wavelength conversion element 33, and a phase matching condition according to non-critical phase matching (NCPM) is established. Generation of the second harmonic of the fourth harmonic is performed by the third optical wavelength conversion element 33, so that the eighth harmonic is generated whose angular frequency is eight times that of the first fundamental wave (i.e. 8ω1) and whose wavelength is one eighth of the wavelength thereof (i.e. λ⅛=237.8 nm).

The eighth harmonic of wavelength 237.8 nm generated by the third optical wavelength conversion element 33 (i.e. ultraviolet laser light at a preliminary stage) is incident upon the fourth optical wavelength conversion element 34 that is disposed in contact with the third optical wavelength conversion element 33. And the second fundamental wave that has been reflected by the dichroic mirror 42 passes through the third optical wavelength conversion element 33 and is incident upon the fourth optical wavelength conversion element 34.

The fourth optical wavelength conversion element 34 generates ultraviolet laser light of wavelength 194.9 nm from the eighth harmonic of the first fundamental wave generated by the third optical wavelength conversion element 33 and the second fundamental wave that has passed through the third optical wavelength conversion element 33. A CLBO crystal is used as the fourth optical wavelength conversion element 34, and a phase matching condition according to non-critical phase matching (NCPM) is established. Sum frequency generation of the eighth harmonic of the first fundamental wave of wavelength 237.8 nm and the second fundamental wave of wavelength 1079 nm is performed by the fourth optical wavelength conversion element 34, and thereby ultraviolet laser light of wavelength 194.9 nm is generated.

The ultraviolet laser light of wavelength 194.9 nm generated by the fourth optical wavelength conversion element 34 is outputted from the final end of the second element series II, and this ultraviolet laser beam Lv of wavelength 194.9 nm is outputted from the wavelength conversion optical system 30C of this ultraviolet laser device LS3.

In this type of ultraviolet laser device LS3 that is equipped with the wavelength conversion optical system 30C, the phase matching in the first and second optical wavelength conversion elements 31 and 32 is quasi phase matching (QPM), while the phase matching in the third and fourth optical wavelength conversion elements 33 and 34 is non-critical phase matching (NCPM), so that all of the four optical wavelength conversion elements are used with types of phase matching in which walk-off does not occur. Due to this, in addition to the fundamental beneficial effects explained above, it is also possible to attain the beneficial effects that wavelength conversion is performed at extremely high efficiency by the wavelength conversion optical system 30C, and that, along with obtaining high output efficiency, it is also possible to obtain an ultraviolet laser beam of high quality.

Furthermore since, in the ultraviolet laser device LS3 of this structural example, the optical elements such as the mirror that causes the light beams to be superimposed and the condensing lenses and so on are disposed in the infra-red to visible region, accordingly it is possible to anticipate that these optical elements will have longer lives, since they are prevented from experiencing damage due to light in the ultraviolet region. While, if optical elements such as a mirror or condensing lenses and so on are disposed in the ultraviolet region, then it becomes necessary to provide a shifting construction for periodically shifting these optical elements, on the other hand, according to this structural example, it is possible to omit this type of shifting mechanism, and due to this the advantageous effects are obtained that it is possible to simplify the structure and make it cheaper, and that it is possible to operate in a stable manner over a long time period. Furthermore, since the third and fourth optical wavelength conversion elements 33 and 34 are arranged so as to be in mutual contact, accordingly it becomes possible to mount them both upon the same shifting stage, and due to this it becomes possible to shift both of the optical wavelength conversion elements 33 and 34 simultaneously. Because of this, it becomes possible to reduce the cost.

While PPLN crystals were used as the first optical wavelength conversion elements 31 in Structural Examples #1 through #3 explained above, it would also be possible to build these elements using other non-linear optical crystals such as PPLT crystals, LBO crystals, BBO crystals (β-BaB$_2$O$_4$), CBO (CsB$_3$O$_5$) crystals, or the like. In a similar manner, while by way of example PPLT and LBO crystals were used for the second optical wavelength conversion elements 32, it would also be possible to build these elements using other non-linear optical crystals such as BBO crystals or CBO crystals or the like.

Furthermore while several representative structural examples have been shown for the case in which the wavelength of the first fundamental wave outputted from the first laser beam output unit 1a was λ1=1902 nm, the wavelength of the second fundamental wave outputted from the second laser beam output unit 1b was λ2=1079 nm, and the wavelength of the ultraviolet laser beam Lv outputted from the wavelength conversion unit 3 was λv=194.9 nm, it would be possible to set the wavelength λ1 of the first fundamental wave, the wavelength λ2 of the second fundamental wave, and the wavelength λv of the ultraviolet laser beam Lv to any appropriate wavelengths.

In this connection, next, a variant example will be explained in which, with a similar optical system and a similar crystal structure to those of the wavelength conversion optical system 30B of Structural Example #2 shown in FIG. 3, different values are employed for the wavelength λ1 of the first fundamental wave, the wavelength λ2 of the second fundamental wave, and the wavelength λv of the ultraviolet laser beam Lv. In this variant example, the wavelength of the first fundamental wave is taken to be λ1=1921.6 nm, the wavelength of the second fundamental wave is taken to be λ2=1064 nm, and the wavelength of the ultraviolet laser beam Lv is taken to be λv=196 nm. It should be understood that, while the optical system and the crystal structure are not shown in the drawings since they are similar to those of the wavelength conversion optical system 30B of Structural Example #2, in order to avoid confusion, the wavelength conversion unit of this variant example will be referred to as 30B' in the following explanation.

Variant Example

A first laser beam output unit 1a generates seed light Ls1 having wavelength λ1=1921.6 nm with a first laser light source 11, this seed light is amplified by a first optical fiber amplifier 21 (a thulium doped optical fiber amplifier), and the resulting amplified first infra-red laser beam La1 is incident into the wavelength conversion optical system 30B'. In a similar manner, a second laser beam output unit 1b generates seed light Ls2 having wavelength λ2=1064 nm with a second laser light source 12, this seed light is amplified by a second optical fiber amplifier 22 (an ytterbium doped optical fiber amplifier), and the resulting amplified second infra-red laser beam La1 is incident into the wavelength conversion optical system 30B'.

By the process of being propagated through the first element series I, the first fundamental wave of wavelength λ1=1921.6 nm and angular frequency ω1 that is incident into this first element series I is wavelength converted by the two optical wavelength conversion elements 31 and 32 that are provided to the first element series I into its fourth harmonic, whose angular frequency is four times that of the first fundamental wave (i.e. 4ω1) and whose wavelength is one quarter of the wavelength thereof (i.e. λ¼=480.4 nm).

The first optical wavelength conversion element 31 converts the first fundamental wave of angular frequency ω1 into its second harmonic of angular frequency 2ω1. The first optical wavelength conversion element 31 is a PPLN crystal, and a phase matching condition according to quasi phase matching (QPM) is established. Generation of the second harmonic of the first fundamental wave is performed by the first optical wavelength conversion element 31, so that the second harmonic is generated whose angular frequency is twice that of the first fundamental wave (i.e. 2ω1) and whose wavelength is one half of the wavelength thereof (i.e. λ½=960.8 nm). This second harmonic of wavelength 960.8 nm that has been generated by the first optical wavelength conversion element 31 is incident upon the second optical wavelength conversion element 32.

The second optical wavelength conversion element 32 wavelength converts the second harmonic of angular frequency 2ω1 that has been generated by the first optical wavelength conversion element 31 into the fourth harmonic whose angular frequency is 4ω1. This second optical wavelength conversion element 32 is an LBO crystal, and a phase matching condition according to Type I phase matching is established. Second harmonic generation is performed by the second optical wavelength conversion element 32, so that the fourth harmonic is generated whose angular frequency is four times that of the first fundamental wave (i.e. 4ω1) and whose wavelength is one quarter of the wavelength thereof (i.e. λ¼=480.4 nm).

At this time, the fourth harmonic laser light beam that has been emitted from the second optical wavelength conversion element 32 becomes slightly elliptical due to walk-off, but the walk-off angle is small at around 8 mrad, and the light beam is corrected into a circular light beam by two cylindrical lenses, and then is incident upon the dichroic mirror 42.

The dichroic mirror 42 is adapted to pass the fourth harmonic of the first fundamental wave of wavelength 480.4 nm, and to reflect the second fundamental wave of wavelength 1064 nm. The fourth harmonic of the first fundamental wave (4ω1) passes through the dichroic mirror 42 and is condensed and incident upon the third optical wavelength conversion element 33 that is provided in the second element series II. It should be understood that, with regard to the setting of the pass wavelength of the dichroic mirror 42, as has already been explained, in this variant example as well, by setting the pass wavelength to be less than around 500 nm (so that the reflection wavelength is 500 nm and greater), it is possible to prevent laser light of non-required wavelengths from being incident upon the optical wavelength conversion elements in the second element series II.

The second infra-red laser beam of wavelength λ2=1064 nm (i.e. the second fundamental wave) that is outputted from the second optical fiber amplifier 22 is incident upon the dichroic mirror 42 so as to intersect upon the optical axis with the fourth harmonic (4ω1) of the first fundamental wave that passes through the dichroic mirror 42. Thus, the second fundamental wave that has been reflected by the dichroic mirror 42 is coaxially superimposed upon the fourth harmonic of the first fundamental wave that has passed through the dichroic mirror 42, and the combination is then condensed and is incident upon the third optical wavelength conversion element 33 in the second element series II.

The third optical wavelength conversion element 33 that is provided in the second element series II wavelength converts the fourth harmonic of angular frequency 4ω1 that has passed through the dichroic mirror 42 into the eighth harmonic whose angular frequency is 8ω1. The third optical wavelength conversion element 33 is a CLBO crystal, and, in this variant example, a phase matching condition according to Type I phase matching is established. Generation of the second harmonic of the fourth harmonic is performed by the third optical wavelength conversion element 33, so that the eighth harmonic is generated whose angular frequency is eight times that of the first fundamental wave (i.e. 8ω1) and whose wavelength is one eighth of the wavelength thereof (i.e. λ⅛=240.2 nm). At this time, the walk-off angle is around 11 mrad.

The eighth harmonic of wavelength 240.2 nm generated by the third optical wavelength conversion element 33 is incident upon the fourth optical wavelength conversion element 34 that is disposed in contact with the third optical wavelength conversion element 33. And the second fundamental wave that has been reflected by the dichroic mirror 42 passes through the third optical wavelength conversion element 33 and is incident upon the fourth optical wavelength conversion element 34.

The fourth optical wavelength conversion element 34 generates ultraviolet laser light of wavelength 196 nm from the eighth harmonic of the first fundamental wave generated by the third optical wavelength conversion element 33 and the second fundamental wave that has passed through the third optical wavelength conversion element 33. The fourth optical wavelength conversion element 34 is a CLBO crystal, and a phase matching condition according to non-critical phase matching (NCPM) is established. Sum frequency generation of the eighth harmonic of the first fundamental wave of wavelength 240.2 nm and the second fundamental wave of wavelength 1064 nm is performed by the fourth optical wavelength conversion element 34, and thereby ultraviolet laser light of wavelength 196 nm is generated.

The ultraviolet laser light of wavelength 196 nm generated by the fourth optical wavelength conversion element 34 is outputted from the final end of the second element series II, and thus an ultraviolet laser beam Lv of wavelength 196 nm is outputted from the wavelength conversion optical system 30B' of this ultraviolet laser device LS2.

Moreover, with this type of ultraviolet laser device incorporating the wavelength conversion optical system 30B', along with it being possible to anticipate increase of the service life due to prevention of damage to the optical elements that make up the wavelength conversion units, it is also possible to eliminate any shifting construction for periodically shifting optical elements such as mirrors for superposition and condensing lenses and so on, so that the beneficial effects are obtained of being able to simplify the structure, to reduce the cost, and to stabilize the operation over the long term.

With the ultraviolet laser devices according to the various embodiments of the present invention, it is possible to provide a structure that outputs ultraviolet laser light of an appropriate wavelength of 200 nm or shorter by changing the setting for the wavelength λ1 of the first fundamental wave outputted from the first laser beam output unit 1a and the setting for the wavelength λ2 of the second fundamental wave outputted from the second laser beam output unit 1b.

Along with the ultraviolet laser device of the present invention being compact and light in weight, it is also easy to handle, and accordingly it can be appropriately applied to optical processing devices and inspection devices such as, for example, observation devices such as microscopes and telescopes and so on, to measurement devices such as distance measurement devices or shape measurement devices and so on, to optical processing devices such as optical manufacturing devices and exposure devices and so on, and to therapy devices.

While various embodiments and variant embodiments have been explained in the above description, the present invention should not be considered as being limited by the contents thereof.

The content of the disclosure of the following patent application, upon which priority is claimed, is hereby incorporated herein by reference:

Japanese Patent Application 066,775 of 2011 (filed on 24 Mar. 2011).

The invention claimed is:

1. An ultraviolet laser device comprising a laser beam output unit that outputs infra-red laser beams, and a wavelength conversion unit comprising optical wavelength conversion elements that wavelength convert the infra-red laser beams outputted from the laser beam output unit into a laser light beam of ultraviolet wavelength that is outputted, wherein:
 the laser beam output unit comprises a first laser beam output unit that outputs a first infra-red laser beam, and a second laser beam output unit that outputs a second infra-red laser beam;
 the wavelength conversion unit comprises a first element series that the first infra-red light beam from the first laser beam output unit is incident upon and propagated through, and a second element series that the first infra-red light beam propagated through the first element series and the second infra-red laser beam outputted from the second laser beam output unit are incident upon, combined in, and propagated through;
 and constructed so that ultraviolet laser light is outputted from the second element series, due to the first and second infra-red laser beams that are incident upon the wavelength conversion unit being wavelength converted by optical wavelength conversion elements provided to the wavelength conversion unit, and
 wherein the optical wavelength conversion elements included in the wavelength conversion unit include:
  a first optical wavelength conversion element that generates a second harmonic of the first infra-red laser beam;
  a second optical wavelength conversion element that generates a second harmonic of the second harmonic that is emitted from the first optical wavelength conversion element, namely a fourth harmonic of the first infra-red laser beam;
  a third optical wavelength conversion element that generates preliminary stage ultraviolet laser light that is a second harmonic of the fourth harmonic emitted from the second optical wavelength conversion element, namely an eighth harmonic of the first infra-red laser beam; and
  a fourth optical wavelength conversion element that generates ultraviolet laser light by sum frequency generation of the preliminary stage ultraviolet laser light and the second infra-red laser beam.

2. The ultraviolet laser device according to claim 1, wherein the first optical wavelength conversion element and the second optical wavelength conversion element are provided in the first element series, and the third optical wavelength conversion element and the fourth optical wavelength conversion element are provided in the second element series.

3. The ultraviolet laser device according to claim 1, wherein the first optical wavelength conversion element, the second optical wavelength conversion element and the third optical wavelength conversion element are provided in the first element series, and the fourth optical wavelength conversion element is provided in the second element series.

4. The ultraviolet laser device according to claim 1, wherein a phase matching in the third optical wavelength conversion element and a phase matching in the fourth optical wavelength conversion element are non-critical phase matching.

5. The ultraviolet laser device according to claim 1, wherein the phase matching in the first optical wavelength conversion element and the phase matching in the second optical wavelength conversion element are quasi phase matching.

6. The ultraviolet laser device according to claim 1, wherein the first laser beam output unit comprises a thulium doped optical fiber amplifier.

7. The ultraviolet laser device according to claim 1, wherein the second laser beam output unit comprises an ytterbium doped optical fiber amplifier.

8. The ultraviolet laser device according to claim 1, wherein the ultraviolet laser light is deep ultraviolet light whose wavelength is 190 to 200 nm.

* * * * *